United States Patent Office 3,726,648
Patented Apr. 10, 1973

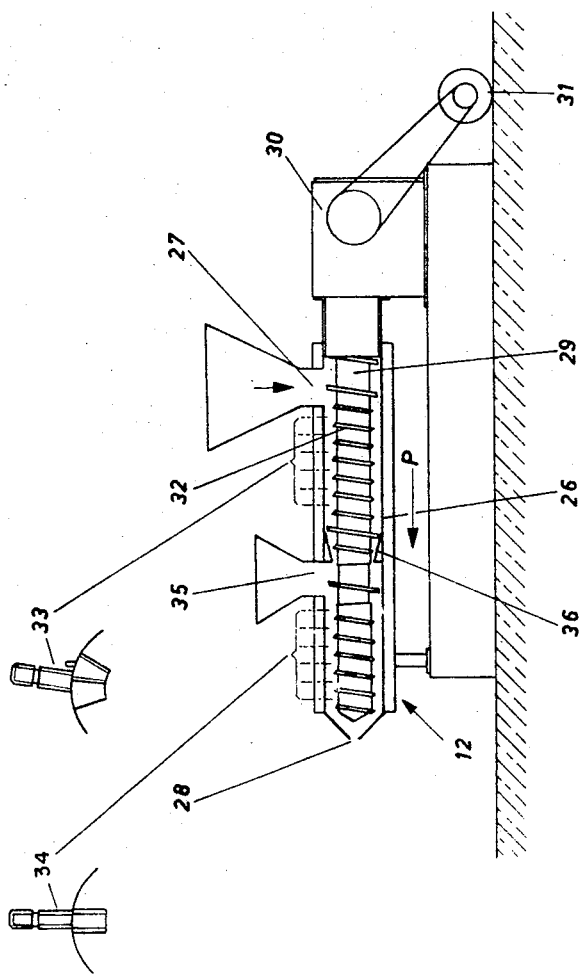

3,726,648
BULK POLYMERIZER FOR VINYL CHLORIDE
PRODUCTION
Wilhelm G. Weber, Pratteln, Walter Gresch, Muttenz,
and Ivan Stojanovic, Pratteln, Switzerland, assignors to
Buss Aktiengesellschaft, Basel, Switzerland
Filed Jan. 25, 1971, Ser. No. 109,514
Int. Cl. C08f 1/04, 1/10, 3/30
U.S. Cl. 23—260
2 Claims

ABSTRACT OF THE DISCLOSURE

Apparatus for bulk polymerization comprising feeding means for continuously feeding a monomer and reaction initiator additives in a jacketed reaction vessel with mixing and simultaneously conveying means therefore for moving the components in a main conveying direction. The apparatus includes means within the reaction vessel for repeatedly feeding a predetermined and selectable portion of the reaction mass in a direction opposite to the main conveying direction and backwards into the preceding reaction spaces.

---

Figure 1:
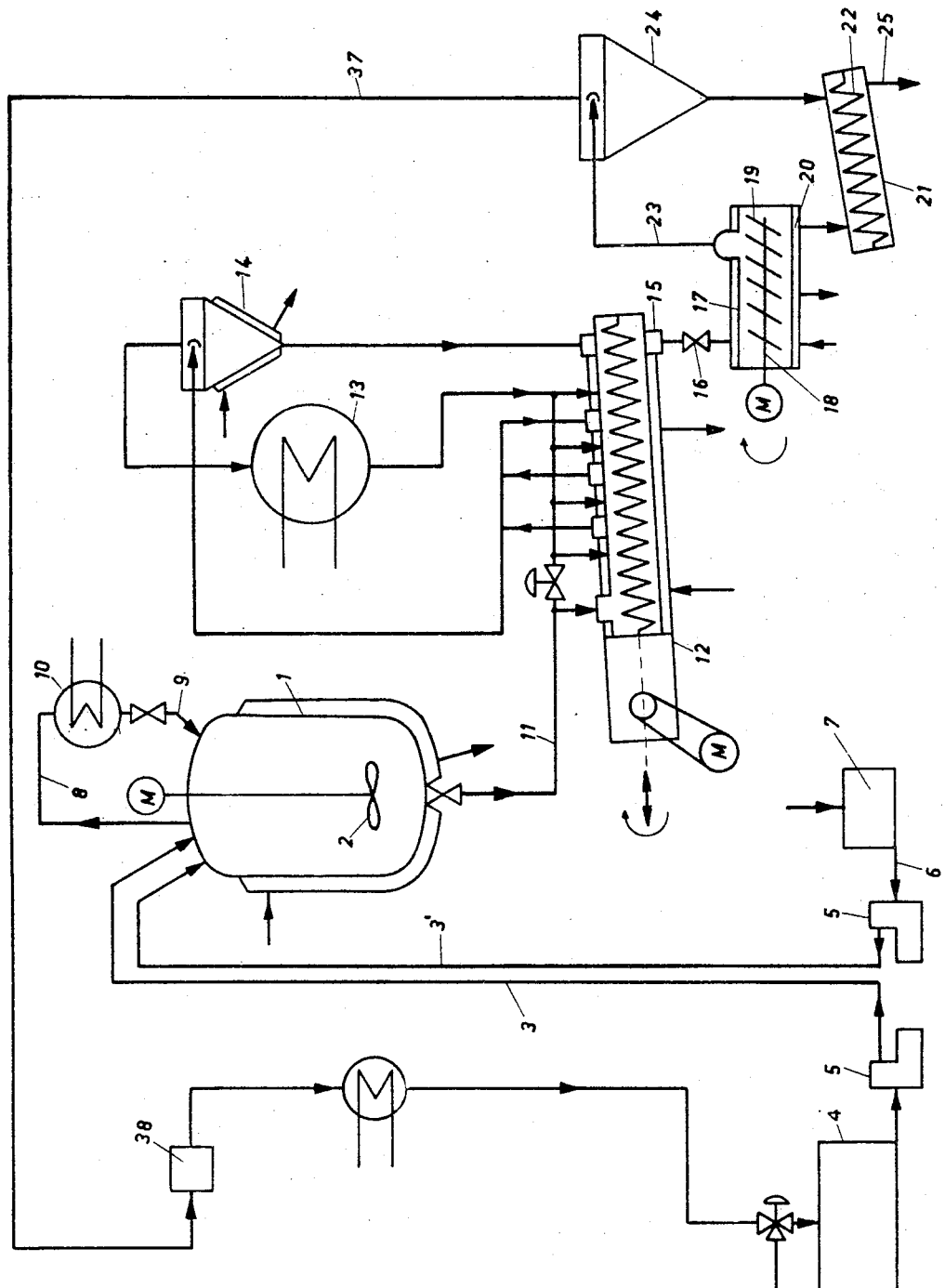

The present invention refers to a process for the continuous production of polymers from vinyl chloride by bulk polymerization, as well as to an apparatus for carrying out the process.

A known process of producing polyvinyl chloride from the vinyl chloride monomer consists in heating the monomer in the presence of a polymerization catalyst, in which process the monomer is supplied in the form of a solution, a suspension or an emulsion.

It is also known to regulate vinyl chloride polymerization and to cut off the polymerization at a predetermined conversion of monomer to polymer, in order to facilitate filtering the mixture and draw off the product in a closed filter vessel, and to carry out further polymerization in a transfer vessel equipped with locks. These known methods are discontinuous rather than continuous because of the need to stop for filtering, liquid transfer or post-polymerization.

It is also known to carry out continuous polymerization in a heated double-walled tube fitted pipe with a threaded spindle arranged inside it, but no practical apparatus or method for continuous bulk polymerization of vinyl chloride on a technical scale has resulted from this idea.

The technical literature (e.g. the book "Polyvinylchlorid und Vinylchlorid-Mischpolimerisate" by F. Kainer, published by Springer, Berlin, 1951, pp. 29-55) decribes a series of processes for performing radical-chain polymerization in inert liquid solvent medium, during which the forming polymer is precipitated out of solution because it is insoluble in the inert liquid solvent medium. These polymerizations run basically through the three main steps of initiation or starting chain growth, and termination or cutoff reactions, being influenced by energy input and/or chemical additives in such manner that the polymer produced has the desired average molecular weight, and further that the deviation from the average lies within narrow limits.

It is a commercial requirement in vinyl chloride polymerization that the polymer produced be of uniform particle size and free of impurities, e.g. practically pure, and free of residues of the surface active chemicals additives.

The production of polymers having the practical continuous described ideal characteristics is exceptionally difficult, and in bulk polymerization it has been possible with acceptable results only in plants operating on the batch principle. In the exploration of new apparatus and methods to control the continuous polymerization to give the desired uniform particle size and pure product, pilot plant work on a laboratory scale has revealed the following steps to be promising:

optimizing the dispersion of the monomer particles by increasing the intensity of agitation as described in British Pat. No. 679,562 (1952).

reducing the amount of additions of dispersion agents, such as surface-active materials, which however may react with the polymerized solution.

adding organic or inorganic materials which are inert to the solution in finely distributed form, which cause a gel effect in the solution and enhances the polymerization rate and the growth of the radical chains. Preferably a small amount of the polymer to be produced, in finely-divided form, is used for this purpose, for example as described in U.S. Pats. 2,279,067 and 2,061,-432.

dividing up the polymerization in a number of vessels with intensive agitation in the first vessel until a sufficient amount of polymer has formed and the gel effect in the monomer solution becomes evident while continuing with slower agitation in further vessels while taking care to avoid dead spaces.

additions in controlled amounts of organic peroxides, which function as initiators to accelerate the start of radical formation on half-life values, which in turn is adjusted to the conversion rate of the monomer to polymer.

use of very small reaction spaces, if possible without any dead locations, to prevent polymer from depositing.

In all prior processes, the characteristics of the apparatus used dictated the temperatures, pressures and levels of mixing intensity, set in relation to the half-life values of the initiator additives as well as of the other known means of influencing the reaction rate, which is such that 10 hours or more of reaction time elapses before the starting monomer is converted up to 70% and more to polymer. Up till now, this disadvantage of slow polymerization and the resulting relatively great expense of equipment for high-volume plants had to be accepted, because the experts knew of no better solution, particularly for the bulk polymerization of vinyl monomers.

The purpose of the invention is to provide a more efficient apparatus and continuous process for bulk polymerization of vinyl chloride, under which all monomers undergoing radical-chain polymerization are precipitated out of the monomer as bulk polymer, thereby permitting copolymers as well as vinyl chloride homopolymer to be produced. According to the invention, the process consists, following initiation of the starting reaction, of the continuous mixing and conveying of vinyl chloride monomer and reaction-initiator additives in a reaction vessel in one pass, with a portion of the reaction mass being repeatedly led backwards into the following reaction spaces, and with the polymer formed being discharged continuously.

This method makes possible a continuous process for carrying out radical-chain polymerization, allowing controlled polymerizations in a wide range of temperature and pressure and with advantageously short average residence time. The polymer produced is found to be of a high order of purity and to have a uniform molecular weight of a desirably low order of deviation from the average.

Of importance is the fact that the mixing of monomer, separated polymer and all other ingredients in the reaction mixture takes place in all spaces of the apparatus during the reaction in compulsory fashion and in all directions, without any possibility of evasion by an individual particle from the intensive mixing reaction. In order to accomplish this mixing action, an arrangement is used employing a cylindrical reaction vessel preferably a horizontal vessel fed with the requisite uniformly mixed reaction mixture and provided with a single conveying screw, this screw having interrupted flights and pursuing both a rotating and an axial back-and-forth motion, the inner wall of the vessel being equipped with stationary wiping devices lying in the path of motion of the gaps in the screw flight which serve to wipe the screw sections. The polymer forming is continually discharged, and at the same time a portion of polymer is mixed and led backwards, so that the incoming stream of monomer is mixed together with this backwardly-led polymer, resulting in a formation of a reaction mass in the gel condition. In this way, the polymerization rate is substantially increased.

It is expedient to mix in polymerization-accelerators in stages to the reaction participants at any desired location along the reaction vessel. For this purpose, the wiping devices can be made in the form of bored-through teeth or pins, through which the monomer and metered quantities of initiators and other additives are introduced to the reaction vessel.

To carry off the heat of polymerization, a preferred means for carrying out the process provides for the evaporation of part of the monomer under pressure and, after condensation and cooling, its return to the reaction vessel. Also monomer residues which are discharged with the polymer can be advantageously evaporated at reduced pressure and, after compression and condensation, led back to the reaction vessel.

The attached drawing illustrates an example of a continuously operating plant executed in accordance with the invention, in which:

FIG. 1 shows a diagrammatic view of apparatus for the continuous polymerization of vinyl chloride and FIG. 2 shows a diagrammatic view of a reactor thereof.

The plant comprises an agitation autoclave 1, equipped with an agitating device 2 and connected via inlet pipe 3 with vinyl chloride monomer storage tank 4 to receive vinyl chloride; feed pump 5, preferably a multiple-piston metering pump, is installed in pipe 3 to pump the tank contents into the autoclave. The catalyst and other additives for the fluid monomer are brought into autoclave 1 by means of inlet pipe 6 which leads from pump 5a to an additional tank 7 for the reaction-initiator additives and, a pipe 3' connects initiator storage tank 7 with the agitation autoclave for controlling the quantity of initiator addition to the monomer mixed therein.

A condenser 10 is connected to the top of the agitation autoclave 1 via the pipe loop 8 (vapor line) and 9 (condensation return), and the reaction mixture from the autoclave 1 is led out of the autoclave through pipe 11 which connects the autoclave with the continuous reactor 12, which is shown in greater detail in FIG. 2 and will be explained below. Connected to the reactor 12 are a condenser 13 and a dust collector 14 for the purpose of returning condensible volatiles and conserving solids which are entrained in escaping vapors. Product which is polymerized in the reactor 12 is led via the reactor discharge 15 leads through a shutoff device 16 to a degassing apparatus 17, this comprising generally horizontal casing into which is fitted a horizontal shaft 18 with paddles 19. The discharge outlet 20 of the degassing apparatus 17 leads to a discharging device 21 fitted with transfer screw 22. The degassing apparatus 17 is connected via pipe 23 to the feed inlet of the dust collector 24, and outlet leads to the discharging device 21. The outlet of the discharging device is designated 25 as shown in FIG. 1.

The detailed arrangement of the reactor 12 can be seen in FIG 2. The reactor comprises a cylindrical casing 26 with in-feed 27 and discharge opening 28. Inside casing 26a screw 29 is mounted, this screw describing a motion which is at the same time rotating and back-and-forth. The drive consists of a gear box 30 and an electric motor 31. The screw 29 carries a spiral consisting of interrupted screw flights 32, which work together with wiping devices arranged on the inside wall of the casing. These wiping devices can be made in the shape of teeth 33 or as pins 34. The wiping devices 33, 34 and the gaps formed by the interruptions between the screw flights 32 are arranged in such a way that the wiping devices always pass through the gaps when the screw 29 rotates and oscillates. To achieve an optimal reaction effect, an alteration of the throughput is reached by reducing the number of gaps between the screw flights. For this purpose, appropriate flight-closing elements are set in after the teeth or pins normally passing through the particular gap are removed.

The casing 26 comprises also at least one degassing opening 35. In the neighborhood of this opening 35, a baffle ring 36 is arranged with a form corresponding to the path of motion of the adjacent screw flight, so that the amount of clearance determined by the axial distance between the screw flight and the baffle ring is constant. The baffle ring limits the cross-section between the screw and the casing to a narrow ring-shaped gap, through which the product passes into the next reaction zone. For startup, vinyl chloride monomer and peroxide reaction-initiator are brought into the agitation autoclave 1 via pipes 3 and 3', and there the mixture is intensively stirred by the agitating device 2 for about one and one-half hours until well-dispersed and until a polymerization conversion of over 10% of the monomer is reached. The reaction heat thus created is carried off partly by cooling the autoclave 1 and by partial evaporation of the monomer. For this purpose, the autoclave is equipped with a double wall to permit the circulation of a cooling liquid. The evaporated monomer escapes through pipe 8, reaches condenser 10 where it is condensed, and finally returns to the agitation autoclave 1 through pipe 9. As required, the return through pipe 9 can be closed off. As soon as sufficient fresh polymer is present for the process, further monomer is pumped out of tank 4 into the agitation autoclave 1, to effect the transfer of material continuously to the feed inlet 27 of the continuous reactor 12. In the continuous operation which ensues, it is possible to circumvent the agitation autoclave, in that monomer and additives are separately metered by feed pump 5 and led by separate pipes directly to the reactor 12.

For certain starting reactions it is advantageous to replace the agitation autoclave 1 by a different mixing reactor, e.g. by a mixing turbine as described in detail in applicants' Austrian Pat. 274,742.

In continuous operation, metered quantities of monomer and additive flow into the reactor 12 through the inlet 27 and, possibly, through the wiping devices 33, 34. The rotation and simultaneous back-and-forth motion of the screw 29 with screw flights 32 effects in one pass an intensive intermixing of the reaction components and conveys them in such a way that a portion of the reaction mass is repeatedly shifted backwards opposite to the forward direction P into the following reaction spaces. Through the oscillating motion of the screw 29, the wiping devices 33, 34 pass through the gaps between the screw flights 32 and wipe from them the reaction mass which has clung. The result is a thorough intermixing in all directions, during which a dominating plug-type movement in the direction of discharge opening 28 is superposed on the backwards mixing described above. The backwards flow can be increased by the installation of a baffle ring 36 or can be reduced or limited to individual zones by the installation of flight-closing elements.

To vary the kneading and mixing intensity, the teeth or pins 33 and 34 are used either with thick or with thinner screw flights, whereby the backward-mixed polymer component and the continuously in-flowing monomer are present in a gel condition, this considerably increasing the polymerization rate.

Under certain circumstances, further polymerization accelerators are fed to the reactor 12 through selected bored-through teeth or pins. To remove the heat of polymerization, one allows a part of the monomer to evaporate and go off into the condenser 13. Following condensation and cooling-down, the monomer flows back to the reactor 12. Also those residues of monomer which are discharged together with the polymer are allowed to evaporate at reduced pressure and are then fed back to the reactor 12. It is advantageous to conduct the entire reaction at a moderate and controllable over-pressure, thus simplifying the control of the return flow and of the temperature up to which reaction heat should be carried off. Noncondensable components are segregated in a separator and blown off.

By far the greatest part of the monomer is separated out of the polymer mass while still in the reactor 12, before the polymer is pressed through the shutoff device 16, which can for example be arranged as a rotary valve, into the degassing apparatus 17. The polymer dust which occasionally collects at the discharge is segregated out in separator 14 and returned.

The degassing apparatus 17 also works continuously and can, for example, be constructed as described in French Pat. 1,569,303. Finally the polymer is continuously discharged by the transfer screw 22 and carried to a processing plant by pipe 39.

The described process can be varied over a wide range in many details. This provides the possibilities, familiar to the expert, to adjust to the characteristics of the most diverse producible radical-chain polymers and copolymers. Particularly obvious would be to forego partially or fully with back-mixing in the in-feed of the reactor 12, instead adding fresh polymer to the monomer. Likewise, the initiator additives could be partially or fully replaced by radiation.

The described process allows especially sensitive control and permits the continuous production of polymers or copolymers of striking physical uniformity. The continuous throughput levels are exceptionally high in relation to reactor volumes, so that the process also proves to be extremely economical. Since the reactor contains practically no dead spaces where material remnants could remain, the costly periodical cleaning of polymer deposits can be done away with.

What we claim is:
1. Apparatus for the continuous bulk polymerization of vinyl chloride monomer comprising:
   (1) a jacketed mixing vessel fitted with a rotating agitator, inlet means for feeding additives and outlet means for discharging the thickened and partly polymerized reaction mixture containing up to about 10% of polymerized vinyl chloride resulting from the chemical reaction;
   (2) a horizontal reactor comprising a cylindrical housing having an inlet and outlet and fitted with a single, conveying screw having interrupted flights, said screw simultaneously rotating and oscillating to convey the thickened partly polymerized reaction mixture fed into the inlet from said mixing vessel in a horizontal main direction towards the outlet of said reactor;
   (3) stationary wiping devices including bored portions for feeding fitted onto the inner wall of the housing of said reactor which are arranged in the gaps between the interrupted screw flights of said conveyer, said wiping devices cooperating with the rotary and oscillating movement of said screw to move a pre-direction opposite to the horizontal movement of the mixture from the reactor inlet to the reactor outlet to thereby create a uniform further thickening of gel in said reactor which accelerates polymerization and eliminates any dead spaces; and,
   (4) degassing means between the inlet and outlet of such reactor, including an annular baffle member providing clearance for the movement of the thickened mixture and through which monomer can escape for condensation, cooling and return to the reactor to aid in controlling the temperature of polymerization.

2. Apparatus as claimed in claim 1, wherein said bored portions provide elongated tubular inlets through which vinyl monomer, initiators and additives in liquid form are introduced along portions of the length of said reactor.

References Cited
UNITED STATES PATENTS

| | | | |
|---|---|---|---|
| 3,522,227 | 7/1970 | Thomas | 260—92.8 |
| 3,023,455 | 3/1962 | Geier et al. | 259—2 X |
| 3,538,067 | 11/1970 | Bognar | 23—290 X |

JAMES H. TAYMAN, Jr., Primary Examiner

U.S. Cl. X.R.

425—200, 209; 260—92.8 R, 92.8 A; 259—2, 93, 5, 10; 159—2 E